United States Patent [19]
Pitt

[11] Patent Number: 5,442,469
[45] Date of Patent: Aug. 15, 1995

[54] ELECTRO-OPTICAL DISPLAY DEVICE WITH ELECTROSTATIC BREAKDOWN CONTROL MEANS

[75] Inventor: Michael G. Pitt, Eindhoven, Netherlands

[73] Assignee: U.S. Philips Corporation, New York, N.Y.

[21] Appl. No.: 29,812

[22] Filed: Mar. 11, 1993

[30] Foreign Application Priority Data

Apr. 3, 1992 [EP] European Pat. Off. ............ 92200951

[51] Int. Cl.[6] .............................................. G02F 1/136
[52] U.S. Cl. ........................................ 359/58; 359/60; 359/88; 359/87
[58] Field of Search ................ 359/58, 60, 87, 88, 359/80; 257/356, 546; 345/90, 91, 93; 361/91

[56] References Cited

U.S. PATENT DOCUMENTS

| | | |
|---|---|---|
| 4,600,273 | 7/1986 | Ohno .................................... 359/81 |
| 4,626,073 | 12/1986 | Amstutz et al. ...................... 359/81 |
| 5,220,443 | 6/1993 | Noguchi ............................... 359/59 |

FOREIGN PATENT DOCUMENTS

| | | |
|---|---|---|
| 0369450 | 5/1990 | European Pat. Off. . |
| 0369828 | 5/1990 | European Pat. Off. . |

*Primary Examiner*—William L. Sikes
*Assistant Examiner*—Tai V. Duong
*Attorney, Agent, or Firm*—John C. Fox

[57] ABSTRACT

In a display device (1) with symmetrical two-pole switching elements (9) on a first substrate (active plate) damage due to electrostatic discharge of too high voltages across row electrodes (11) on a second substrate (passive plate) is prevented by arranging switching units (13) on the first substrate. The switching units are connected to the row electrodes (11) on the second plate via, for example an anisotropic conductor. Electrostatic discharge between column electrodes (8) and row and column electrodes is also prevented by arranging extra switching units (16, 26) on the active plate.

15 Claims, 3 Drawing Sheets

ELECTRO-OPTICAL DISPLAY DEVICE WITH ELECTROSTATIC BREAKDOWN CONTROL MEANS

BACKGROUND OF THE INVENTION

The invention relates to a display device comprising an electro-optical display medium between two supporting plates, a system of pixels arranged in rows and columns, with each pixel being formed by picture electrodes arranged on the facing surfaces of the supporting plates, and a system of row and column electrodes for presenting selection and data signals, a picture electrode on one of the supporting plates being connected in an electrically conducting manner to a first non-linear symmetric two-pole switching unit between a column electrode for data signals and the picture electrode.

A display device of this type is suitable for displaying video information and alpha-numerical information by means of passive electro-optical display media such as liquid crystals, electrophoretic suspensions and electrochromic materials.

As used herein, the term "non-linear symmetric two-pole switching unit is understood to mean a switching unit with a current-voltage behaviour which is symmetrical with respect to the I axis in the current-voltage (I-V) characteristic and in which the current depends non-linearly on the applied voltage, such as, for example, a MIM (metal-isolator-metal), a diode ting or a non-linear resistor. Such a switching unit may comprise a single switching element such as, for example, a MIM or a combination of such switching elements which are arranged in series or parallel for reasons of, for example, redundancy.

A display device of the type mentioned in the opening paragraph is described in EP-A-0 369 450. In a device shown in this document, MIMs are used as switching elements.

It is known that electrostatic charging may take place during the manufacture of the supporting plates on which the switching elements are provided (the active plates). A voltage difference may then occur between different column electrodes, such that there is breakdown between these column electrodes, while the switching elements are damaged, and also the conducting tracks constituting the column electrodes may be damaged. In order to prevent this form of breakdown, series arrangements of non-linear resistors are provided between the column electrodes in the device described in EP-A-0 369 450.

Electrostatic breakdown may also occur between the row electrodes on the other supporting plate (the passive plate).

In a further stage of manufacture, when the active plates and passive plates have been joined and (at a still later stage) liquid crystal material or another electro-optical medium is present between the active and the passive plate, breakdown between a row and a column may also occur due to excessively high electrostatic voltages by which the switching element or a component of a pixel may be damaged. For example, degradation of the liquid crystalline material may also occur.

As the manufacture of the display device progresses, damage and consequently rejects due to electrostatic discharge will involve extremely high costs.

OBJECTS AND SUMMARY OF THE INVENTION

It is, inter alia an object of the present invention to provide a display device of the type described in the opening paragraph in which damage due to electrostatic charging between row electrodes and between column and row electrodes is prevented as much as possible.

To this end a display device according to the invention is characterized in that the display device comprises at least a first type of substantially symmetrical extra two-pole switching unit on the supporting plate between points which are connected in an electrically conducting manner to parts of the row electrodes. The electric conductance may be realised, for example by means of an edge of anisotropically conducting material between the first and the second supporting plate. Possible voltages due to electrostatic charging are then limited by the extra switching units. If desired, the edge of anisotropically conducting material (material conducting in a direction perpendicular to the supporting plate but not conducting in a direction in the plane of one of the supporting plates) may function as a sealing edge.

To prevent damage due to electrostatic discharge between row electrodes and column electrodes, a first embodiment of the display device comprises at least a second type of substantially symmetrical extra two-pole switching unit on the supporting plate between a point which is connected in an electrically conducting manner to a row electrode and a column electrode.

Electrostatic discharge between column electrodes can be prevented by providing a third type of substantially symmetrical extra two-pole switching unit between two column electrodes on the first supporting plate.

To economize on switching elements, the first and the third type of switching units may have switching elements in common.

To this end preferred embodiments of a device according to the invention are characterized in that such an extra switching unit is divided into two sub-units which are arranged between two row electrodes (column electrodes) and a common node for at least two switching units. The sub-units are preferably substantially equal.

In such a device the electrostatic breakdown between row electrodes and column electrodes is very well controllable because the nodes of the switching units for the row electrodes and for the column electrodes can be connected together (either or not via a fourth type of substantially symmetrical two-pole switching unit).

BRIEF DESCRIPTION OF THE DRAWING

These and other aspects of the invention will be apparent from and elucidated with reference to the embodiments described hereinafter. In the drawings FIG. 4 is a plan view of a part of the device of FIG. 2 at the area of a sealing edge, while

DESCRIPTION OF THE PREFERRED EMBODIMENTS

Figure 1:
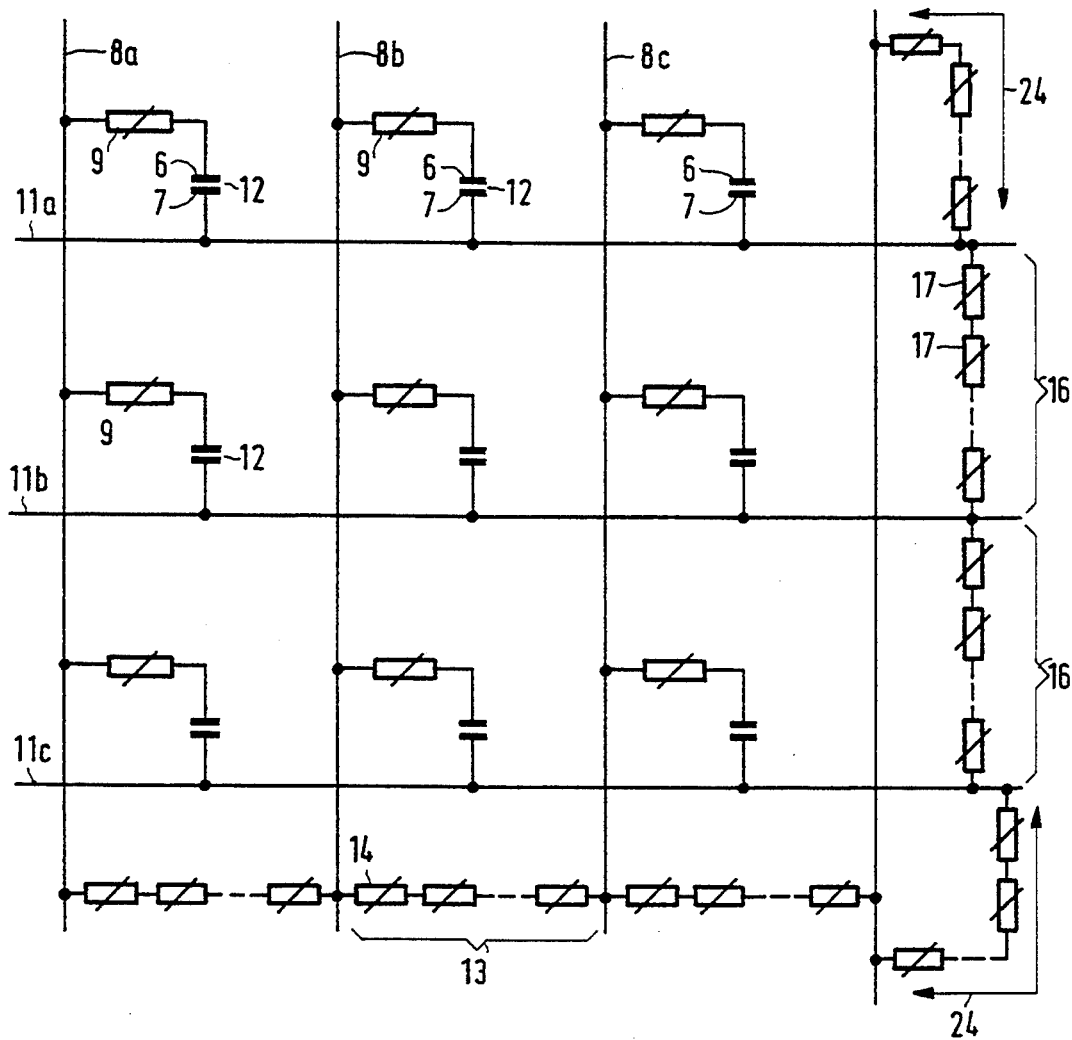
FIG. 1 is a diagrammatic representation of a part of a device according to the invention.

FIG. 1 shows diagrammatically a part of a display device 1 with pixels 12 formed by facing picture electrodes 6, 7. The pixels 12 are connected via the picture electrodes 7 to row electrodes 11, which together with the column electrodes 8 are arranged in the form of a matrix. The pixels 12 are connected to the column electrodes 8 via non-linear two-pole switching units, for example MIMs 9. During selection, information presented to the column electrodes 8 via the row electrodes 7 is transferred via the MIMs 9 to the pixels 12.

Figure 2:
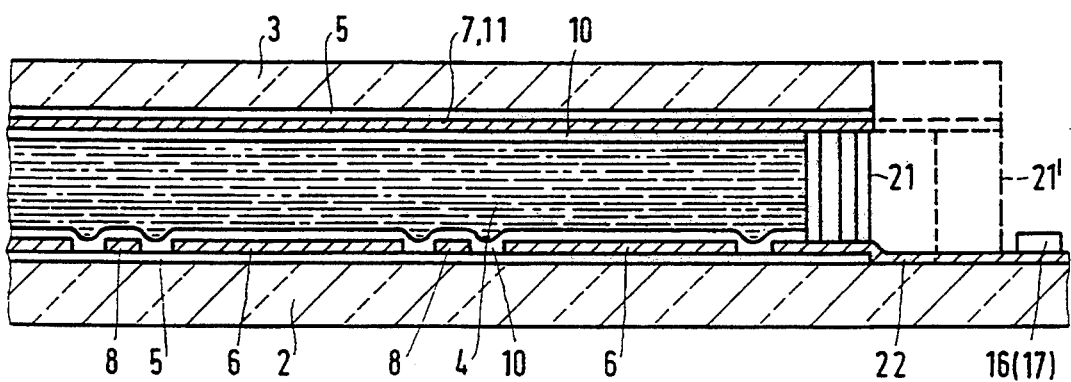
FIG. 2 is a diagrammatic cross-sectional view of such a display device.

FIG. 2 is a diagrammatic cross-section of a part of such a display device according to the invention. This device is a liquid crystal display device 1 (FIG. 2) comprising two supporting plates 2 and 3 between which, for example a twisted nematic liquid crystalline material 4 is present. If necessary, the inner surfaces of the supporting plates 2, 3 comprise chemically and electrically insulating layers 5. The supporting plate 2 is provided with a number of row and column-arranged picture electrodes 6 of indium-tin oxide or another electrically conducting transparent material. Similarly, the other supporting plate 3 is provided with transparent picture electrodes 7 of, for example indium-tin oxide which are integrated to form strip-shaped row electrodes 11. The facing picture electrodes 6, 7 constitute the pixels 12 of the display device. The inner surfaces of the supporting plates 2, 3 are further provided with liquid crystal orienting layers 10. As is known, a different orientation of the liquid crystal molecules and hence an optically different state can be obtained by applying a voltage across the liquid crystal layer 4. The display device may be realised as a transmissive or a reflective device and may have one or two polarizers. The MIMs 9, which connect the picture electrodes 6 to the column electrodes 8, are not shown in the cross-section of FIG. 2.

According to the invention the display device comprises a first type of extra two-pole switching units 16 on the first supporting plate. These switching units prevent the voltage between different row electrodes 11 from becoming too high due to electrostatic charging. Moreover, in the finished device a discharge is prevented from occurring via a pixel and an associated MIM. The switching unit 16 is substantially symmetrical and comprises, for example a plurality (for example 6) of series-arranged MIMs 17, non-linear resistors or a series of diode rings.

For reasons manufacturability it is advantageous to fabricate the switching units 16 by means of the same technology as that which is used for manufacturing the switching elements driving the picture electrodes, in this case the MIMs 9, because the extra switching units 16 can then be realised simultaneously with these switching elements (MIMs) on the first supporting plate 2. Contact between the row conductors 7, 11 and the switching units 16, is provided via an anisotropically conducting edge 21 and a metallization track 22 on the substrate 2. The edge 21 may simultaneously function as a sealing edge or it may be provided separately (21').

Figure 4:
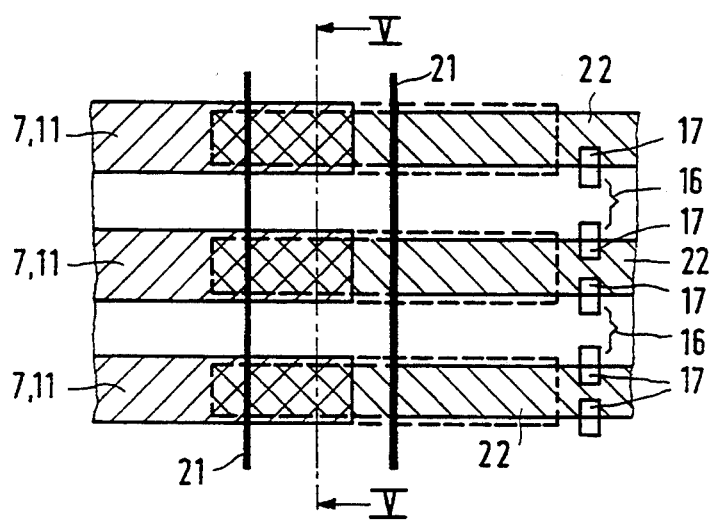
Figure 5:
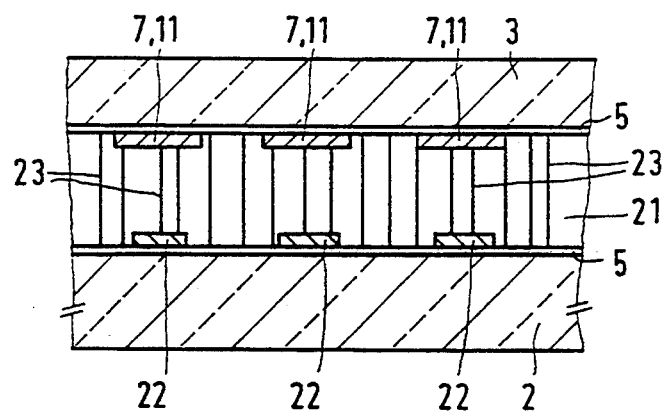
FIG. 5 is a cross-section taken on the line V—V in FIG. 4.

FIGS. 4 and 5 show a possible manner of connection in a plan view and in a cross-section, respectively. Here, the sealing edge 21 consists of anisotropically conducting material, for example a synthetic material layer with elastic pellets dispersed therein, which may be, for example gold-plated, or metal pellets. The anisotropic way of conductance is shown in FIG. 5 by means of conducting tracks 23. These tracks 23 connect the metallization tracks 22, which extend below the edge 21, to row electrodes 7 provided on the supporting plate 3, which electrodes in their turn extend far enough above the edge 21 to ensure electrically conducting contact via the tracks 23.

To prevent electrostatic discharge between the column electrodes 8, the device of FIG. 1 comprises substantially symmetrical two-pole switching units 13, consisting of a series arrangement of MIMs 14 between the column electrodes 8 in this embodiment.

The device of FIG. 1 also comprises substantially symmetrical switching units 24, (via the tracks 23 and the metallization patterns 22) between the row electrodes $11^a$, $11^c$ and column electrode $8^c$, respectively. The switching units 24 again each comprise a plurality of MIMs (for example, 6) arranged on the first supporting plate. In this way, damage of switching elements or of the liquid crystal device due to discharge between these row and column electrodes is prevented in a semimanufactured product in which the two supporting plates 2, 3 are combined via the edge 21 and also in the finished product.

Figure 3:
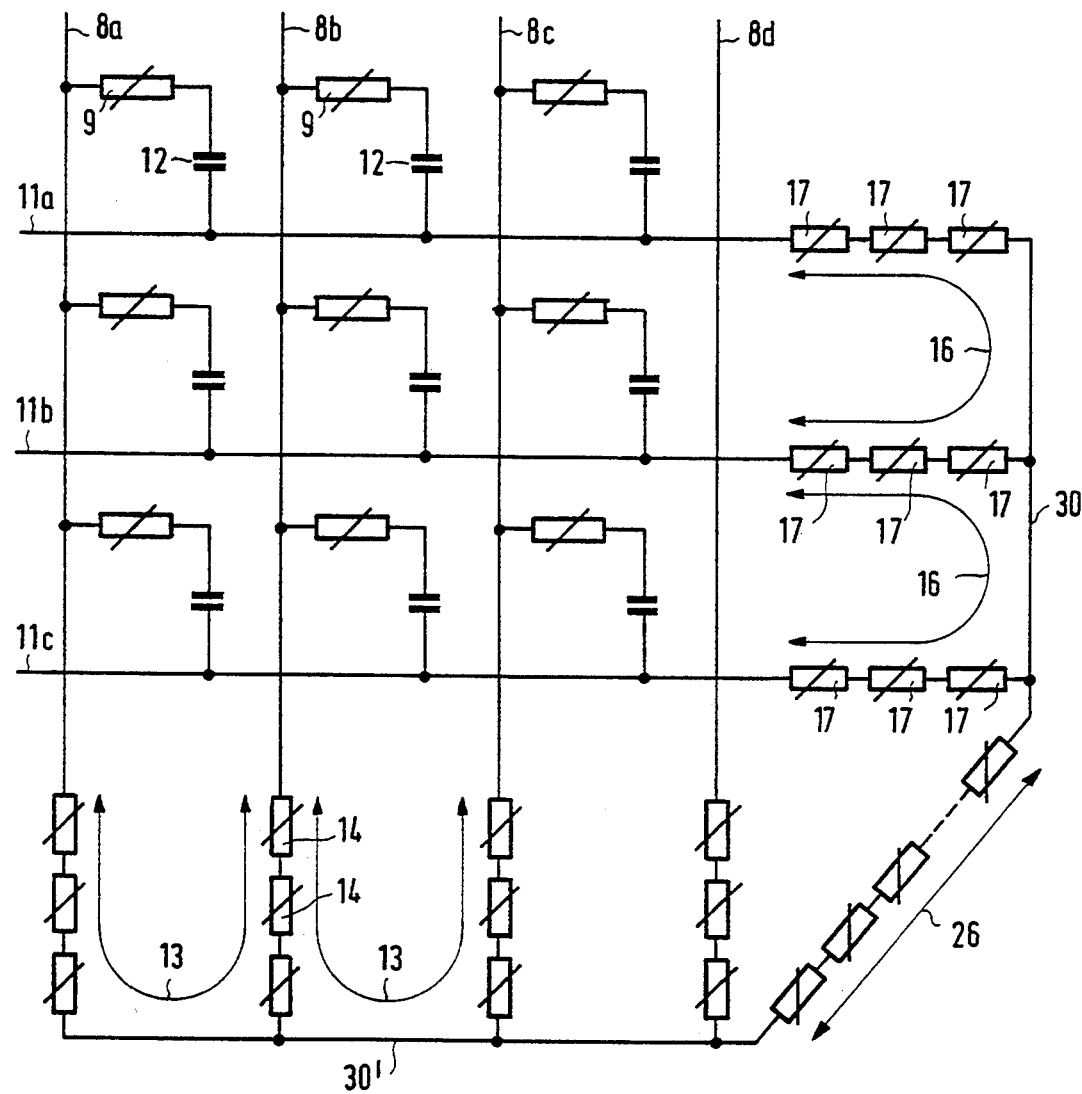
FIG. 3 is a diagrammatic representation of another display device according to the invention.

FIG. 3 shows a modification of FIG. 1 in which different switching units 16 and 13 between the row electrodes 11 and the column electrodes 8 respectively, have switching elements in common (MIMs 17 and 14, respectively in this embodiment). In this embodiment three MIMs 17 are present between each row electrode and a common node 30. In contrast to the device of FIG. 1, a path having an equal number of MIMs can be found between each pair of row electrodes so that electrostatic charging is substantially always limited to a given minimum value. This similarly applies to the electrostatic charging between two arbitrary column electrodes 8. In this embodiment the electrostatic charging remains limited also between an arbitrary column electrode 8 and an arbitrary row electrode 11 because the nodes 30, 30' associated with the row electrodes and the column electrodes, respectively, are interconnected via a substantially symmetrical switching unit 26 comprising MIMs 27. The number of MIMs 27 is determined by the voltages which occur during normal use across the row and column electrodes and should be large enough to produce no electric conductance in the switching unit 26 during use. In principle it is possible that the number of MIMs 17, 14 in the common parts of the switching units 16, 13 is already so high that the switching unit 26 is not necessary and the nodes 30, 30' can be interconnected in an electrically conducting manner.

The invention is of course not limited to the embodiments shown, but several variations are possible within the scope of the invention. For example, the extra switching units 13 need not necessarily be realised outside the area indicated by the broken line 15. The same applies to the switching units 16 and 24. Instead of the edge 21 of anisotropically conducting material, other connections between the row electrodes 11 and the metallization patterns 22, such as bumps, may be used.

Switching units as described hereinbefore may also be present between row or column electrodes and connection tracks of other elements in the display device, such as, for example connections for temperature sensors or other sensors or other circuits which may be damaged by electrostatic discharge.

I claim:

1. A display device comprising an electro-optical display medium between two supporting plates, a system of pixels arranged in rows and columns, with each pixel being formed by picture electrodes arranged on the facing surfaces of the supporting plates, and a system of row and column electrodes for presenting selection and data signals, a picture electrode on of a first one of the supporting plates being connected in an electrically conducting manner to a first non-linear symmetric two-pole switching unit between a column electrode for data signals and the picture electrode, the display device also comprising at least a first type of substantially symmetrical extra two-pole switching unit on said first one of the supporting plates and coupled between points which are connected in an electrically conducting manner to parts of the row electrodes; the display device also comprising at least a second type of substantially symmetrical extra two-pole switching unit on said first one of the supporting plates and coupled to between a column electrode and a point which is connected in an electrically conducting manner to a row electrode.

2. A display device as claimed in claim 1, characterized in that the device comprises a third type of substantially symmetrical extra two-pole switching unit between two column electrodes on the first one of the supporting plates.

3. A display device as claimed in claim 1, characterized in that a first type of substantially symmetrical extra two-pole switching unit is divided into two subunits which are coupled between two row electrodes and a common point for least two switching units of the first type.

4. A display device as claimed in claim 1, characterized in that a third type of substantially symmetrical extra two-pole switching unit is divided into two subunits which are coupled between two column electrodes and a common point for at least two switching units of the third type.

5. A display device as claimed in claim 4, characterized in that the device comprises a fourth type of substantially linear extra two-pole switching unit coupled between common points connecting the switching units of the first and the third type.

6. A display device as claimed in claim 5, characterized in that the common points connecting the extra switching units of the first and the third type are interconnected in an electrically conducting manner.

7. A display device as claimed in claim 1, characterized in that at least one the switching units comprises MIMs.

8. A display device as claimed in claim 1, characterized in that the device has an anisotropically conducting edge for the electric connection.

9. A display device as claimed in claim 8, characterized in that the anisotropically electrically conducting edge also functions as a sealing edge.

10. A display device as claimed in claim 3, characterized in that a third type of substantially symmetrical extra two-pole switching unit is divided into two subunits which are coupled between two column electrodes and a common point for at least two switching units of the third type.

11. A display device as claimed in claim 2, characterized in that at least one of the switching units comprises MIMs.

12. A display device as claimed in claim 3, characterized in that at least one of the switching units comprises MIMs.

13. A display device as claimed in claim 4, characterized in that at least one of the switching units comprises MIMs.

14. A display device as claimed in claim 5, characterized in that at least one of the switching units comprises MIMs.

15. A display device as claimed in claim 6, characterized in that at least one of the switching units comprises MIMs.

* * * * *